United States Patent
Kim et al.

(10) Patent No.: US 7,526,293 B2
(45) Date of Patent: Apr. 28, 2009

(54) APPARATUS AND METHOD FOR LOCATING MOBILE TERMINALS

(75) Inventors: Wuk Kim, Namyangju-si (KR);
Joon-Goo Park, Seoul (KR);
Sang-Kyung Sung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 17 days.

(21) Appl. No.: 10/912,780

(22) Filed: Aug. 6, 2004

(65) Prior Publication Data
US 2005/0070306 A1    Mar. 31, 2005

(30) Foreign Application Priority Data
Sep. 29, 2003    (KR)    ............... 10-2003-0067600

(51) Int. Cl.
*H04Q 7/20*    (2006.01)
(52) U.S. Cl. .................. 455/456.2; 455/456.1
(58) Field of Classification Search ............. 455/456, 455/456.1, 12.1
See application file for complete search history.

(56) References Cited

U.S. PATENT DOCUMENTS

| | | | | |
|---|---|---|---|---|
| 5,903,844 A | * | 5/1999 | Bruckert et al. | ........ 455/456.2 |
| 6,067,455 A | * | 5/2000 | Endo et al. | ............ 455/444 |
| 6,122,483 A | * | 9/2000 | Lo et al. | .............. 455/12.1 |
| 6,259,923 B1 | * | 7/2001 | Lim et al. | ........... 455/456.2 |
| 6,266,533 B1 | * | 7/2001 | Zadeh et al. | ......... 455/456.2 |
| 6,526,039 B1 | * | 2/2003 | Dahlman et al. | ........ 370/350 |
| 2002/0077116 A1 | * | 6/2002 | Havinis et al. | ......... 455/456 |
| 2004/0102195 A1 | * | 5/2004 | Naghian et al. | ....... 455/456.1 |

OTHER PUBLICATIONS

GSM 04.35 version 8.1.0 release 1999 Location Services; Broadcast Network Assisted for E-OTD and Global Positioning Systems.*

* cited by examiner

*Primary Examiner*—Lester Kincaid
*Assistant Examiner*—Charles Shedrick
(74) *Attorney, Agent, or Firm*—The Farrell Law Firm, PC (57) ABSTRACT

An apparatus and method for locating mobile terminals is disclosed. A base station transmits a radio signal to mobile terminals located in a specific area, and generates auxiliary location information for locating mobile terminals from a radio signal received from the terminals. A radio network controller receives the auxiliary location information of the terminals from the base station, and calculates locations of the terminals using the auxiliary location information. A cell broadcaster broadcasts information including assisted GPS information and an auxiliary location information request signal to the terminals located in the area. A core network manages information of mobile terminals connected to a network, and provides an interface with a location service client. This allows location of all of the terminals located in the specific area, irrespective of whether the provision of their location information is permitted, which facilitates rescue when a disaster or calamity occurs in the specific area.

21 Claims, 6 Drawing Sheets

| Information Element | | Data Type | Presence | Value |
|---|---|---|---|---|
| SERVICE TYPE | | BYTE | Mandatory | request_UE_location_within_area |
| LCS Client Id | | String | Mandatory | Encrypted |
| Ciphering Serial Number | | Integer | Mandatory | Encrypted |
| GEOGRAPHICAL AREA | Type | BYTE | Mandatory | address |
| | | | | cell ID list |
| | | | | polygon |
| | Size | Integer | Mandatory | |
| | Value | list | Mandatory | |
| | Name | String | Optional | 128byte |
| AXIMUM ALLOWABLE NUMBER OF UES | | Integer | Optional | 0~99999 |
| MAXIMUM RESPONSE TIME | | | Mandatory | |
| | Hour | Integer | Optional | 0~24, default 0 |
| | Min | Integer | Mandatory | 0~60, default 0 |
| | Sec | Integer | Mandatory | 0~60 |

FIG. 6

| Information Element | Data Type | Presence | Value |
|---|---|---|---|
| Cell Broadcast Header | | | |
| Message Type | BYTE | Mandatory | Cell_broadcast |
| Message ID | BYTE | Mandatory | the corresponding ID to the request for UE location |
| Serial number | BYTE | Mandatory | message code + geographical code + update number |
| SERVICE TYPE | BYTE | Mandatory | request_UE_location_within_area |
| Reference Time | Integer | Mandatory | time the broadcast message calculated |
| AUXILIARY LOCATION INFORMATION | | Optional | |
| CELL INFO (Neighboring Cell List) | List | Optional | Serving Cell and Neighboring Cell |
| LOCATION OF SERVING CELL | (Lat, Lon) | Optional | (Latitude, Longitude) of Serving Cell |
| LOCATION OF NEIGHBORING CELL | {(Lat, Lon)} List | Optional | A set of {(Latitude, Longitude)} of Neighboring Cell |
| Receive Distribution Control | | Optional | when UE send the result or measurement response |
| Distribution Type | BYTE | Optional | uniform, normal, etc |
| start_time | Integer | Optional | start time the response allowed |
| end_time | Integer | Optional | end time the response allowed |

APPARATUS AND METHOD FOR LOCATING MOBILE TERMINALS

PRIORITY

This application claims priority to an application entitled "APPARATUS AND METHOD FOR LOCATING MOBILE TERMINALS", filed in the Korean Intellectual Property Office on Sep. 29, 2003 and assigned Serial No. 2003-67600, the contents of which are incorporated herein by reference.

BACKGROUND OF THE INVENTION

1. Field of the Invention

The present invention relates to an apparatus and method for locating mobile terminals, and more particularly to an apparatus and method for locating mobile terminals that works together with a global positioning satellite (GPS) to determine the locations of a number of non-identified mobile terminals positioned in a specific area.

2. Description of the Related Art

Figure 1:
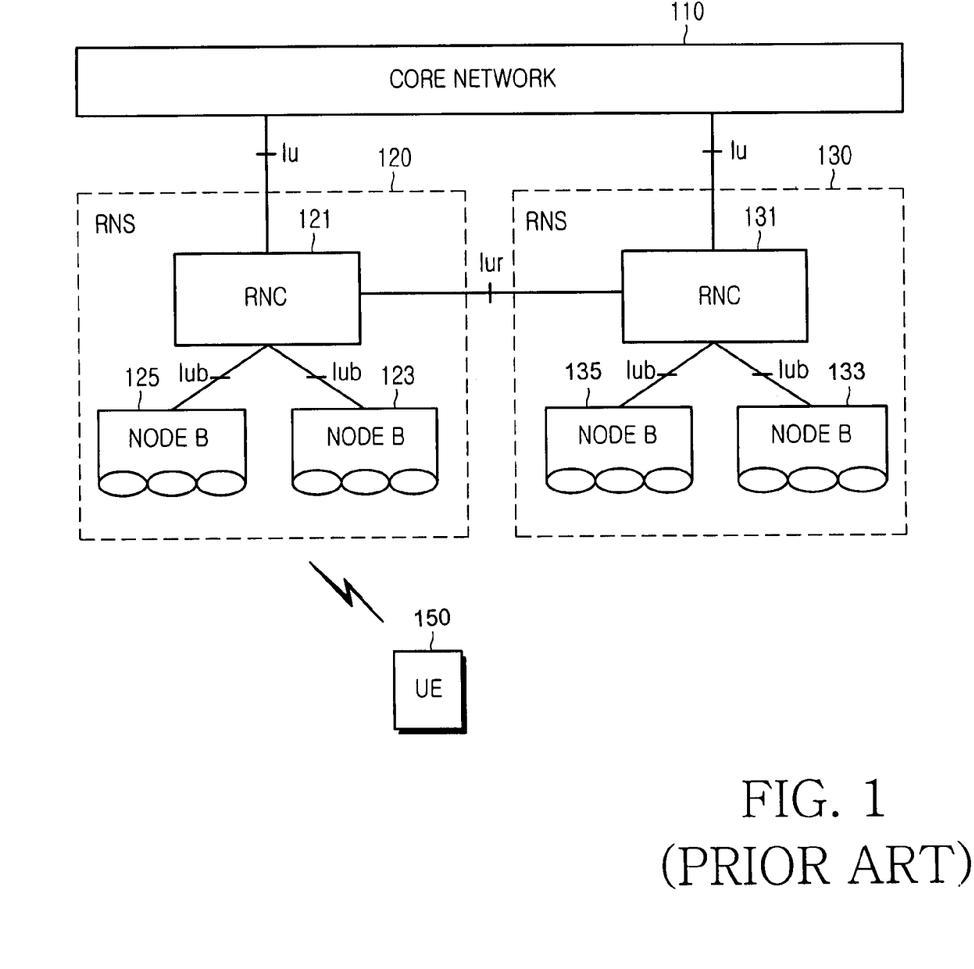
FIG. 1 is a schematic diagram showing the configuration of a general mobile communication system.

FIG. 1 is a schematic diagram showing the configuration of a Universal Mobile Telecommunication System (UMTS) as a general mobile communication system. As shown in this figure, the UMTS includes a Core Network (CN) 110, a plurality of Radio Network Subsystems (RNSs) 120 and 130, and User Equipment (UE) 150.

The CN 110 manages information of UEs 150, and performs mobility management, session management, and call management. The RNS 120 or 130 serves to transfer data received from the CN 110 to users via a wireless or an airwave interface. To this end, the RNS 120 or 130 includes a Radio Network Controller (RNC) 121 or 131, and a plurality of base stations (node B) 123 and 125 or 133 and 135. The RNC 121 or 131 is classified into a serving RNC (SRNC), a drift RNC (DRNC) and a controlling RNC (CRNC) based on its operation. The SNRC is an RNC that manages information of UEs belonging to the RNC, and handles data transmission between the UEs and the CN 110 via an Iu interface. The DRNC is an RNC that intermediates data transmission between a UE belonging to a different RNC and an RNC (for example, an SRNC) to which the UE belongs. The CRNC is an RNC that controls each of the base stations. For example, in FIG. 1, if the RNC 121 manages the information of the UE 150, the RNC 121 is an SRNC of the UE 150, and if the UE 150 moves and communicates data with the RNC 121 via the RNC 131, the RNC 131 is a DRNC of the UE 150. In addition, the RNC 121, which controls the base station (node B) 125 in communication with the UE 150, is a CRNC of the base station 125. In the example of FIG. 1, information and data of the UE 150 is transmitted and received from the CN 110 via the RNC 121 that is an SRNC of the UE 150.

There are various methods for locating UEs in a mobile communication network, those are generally divided into three methods. The first is a cell-based location method in which the location of a UE is determined based on information of a cell located nearest to the UE or based on information of a cell that manages the UE. The second is a network-based location method in which a signal measured between the node B and a UE is used to calculate a Time of Arrival (TOA) or a Time Difference of Arrival (TDOA) based on the intensity of the signal or based on radio wave transfer time thereof and the location of the UE is determined by triangulation using the calculated TOA or TDOA. The third is a GPS-based location method in which the location of a UE is determined using a Global Positioning System (GPS) developed by the US Department of Defense. One particular GPS-based location method, which complements and applies the GPS technology to a mobile communication network, is called Network-Assisted GPS (Network-AGPS).

In the prior art, if a Location Service (LCS) client located external to a network requests location determination of a UE, a preparatory process for locating the UE is first performed, and a signal required to locate the UE is measured, and then the location of the UE is calculated based on the measured signal. In the preparatory process, a privacy indicator for limiting access to personal information or the like of the UE is read and network resources are allocated. Then a location technique is selected according to the performance of the UE and the network and quality of Service (QoS) requested by the LCS client. The location measurement process is performed between the Universal Terrestrial Random Access Network (UTRAN) and the UE. In this process, a location measurement signal, including a signal required to measure the location of the UE, is obtained and then the location of the UE is calculated using the location technique selected in the preparatory process. Here, the UE must be an individual UE whose Mobile Subscriber ISDN number (MSISDN) or International Mobile Subscriber Identity (IMSI) is already known.

Figure 2:
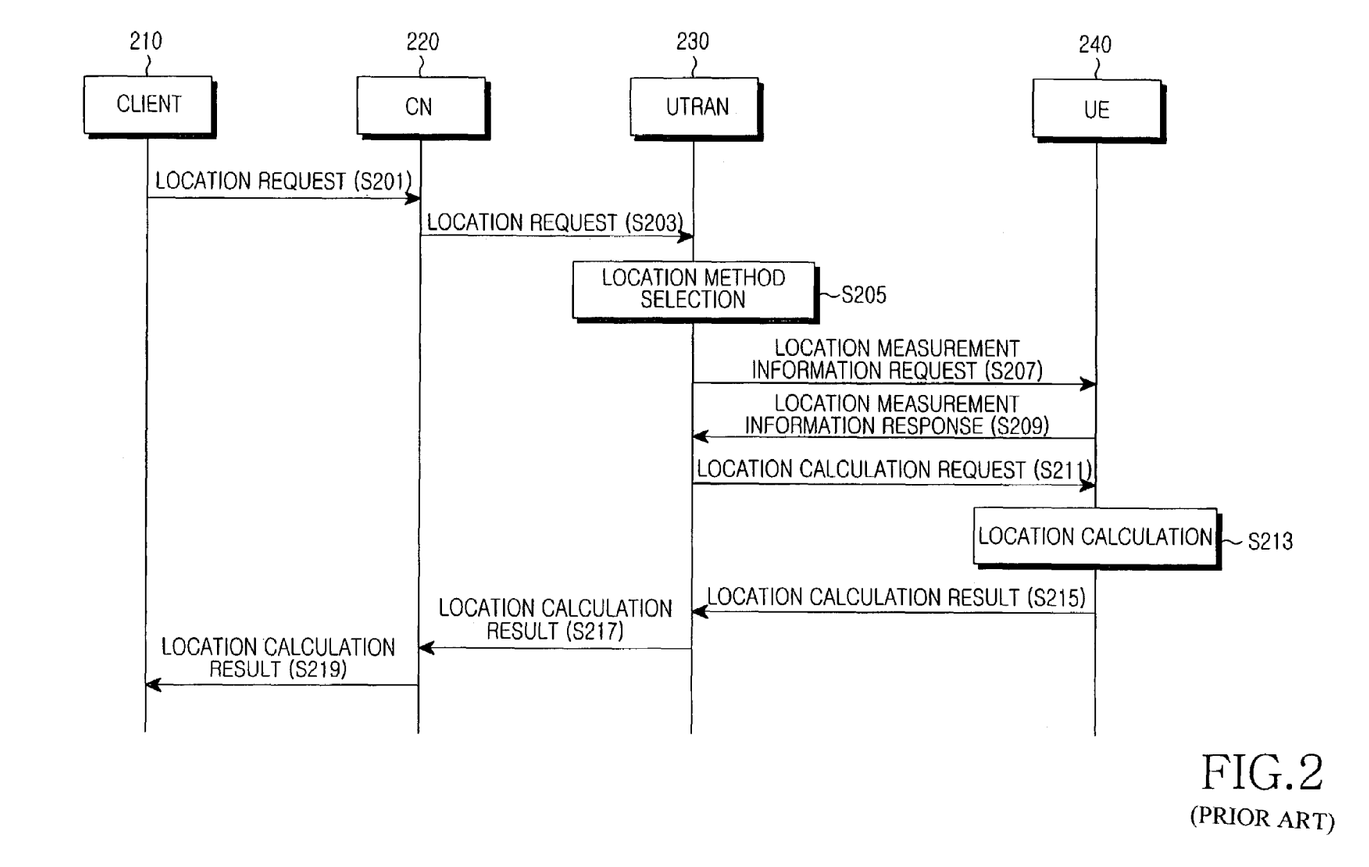
FIG. 2 is a signal flow diagram showing a conventional method for locating mobile terminals.

FIG. 2 is a signal flow diagram showing a conventional method for locating mobile terminals. The conventional mobile terminal location method will now be described with reference to FIG. 2. First, in step S210 if a client 210 requests a CN 220 to locate a UE 240, the location of the UE 240, which the client 210 desires to know, to locate the UE 240 in step S203, the CN 220 requests a UTRAN 230 to which the UE 240 belongs. Then, in step S205 the UTRAN 230 selects a location method according to the performance of the UE 240, requests the UE 240 to provide location measurement information required for the selected location determination method in step SS207, receives a response to the request from the UE 240 in step SS209. The UTRAN 230 calculates the location of the UE using the received information. Alternatively, in step S211 the UTRAN 230 requests the UE 240 to calculate the location, and in step S215 receives the location calculation result calculated in step SS213 from the UE 240, and then transmits the location calculation result to the client 210 via the CN 220 in steps SS217 and S219. In this manner, the UTRAN 230 informs the CN 220 and the client 210 of the location of the UE 240. Here, as described above, the UE must be an individual UE whose MSISDN or IMSI is already known.

In this conventional method, the location measurement of a UE, which is located in a specific area and the location of which is known on a cell basis, is performed only if the LCS client already knows the identifier (MSISDN or IMSI) of the UE. This means that the conventional method can measure only the locations of UEs connected to a communication network. Thus, the conventional method cannot measure the location of an idle UE, which is located in a specific area but is in an idle state, since the location of the idle UE is not managed by an RNC. If the identifier (MSISDN or IMSI) of the idle UE is known, the location, even of the idle UE, can be determined after approximately locating the UE by performing paging of the idle UE. This indicates that the conventional method can locate the UE only if the identifier (MSISDN or IMSI) of the UE is known.

The conventional location method has an additional problem in that processing time increases proportional to the number of UEs, and individual wireless connections cause inefficient use of wireless resources.

In the prior art, as described above, the location of a mobile terminal is detected only when an identifier of the mobile terminal is known and the mobile terminal permits the provision of its location information. This causes mobile terminal location detection to be restricted when attempting to locate mobile terminals for the purpose of rescue when a disaster or a calamity occurs in a specific area such as a rail station, an airport or a mountain.

SUMMARY OF THE INVENTION

Therefore, the present invention has been made in view of the above problem, and it is an object of the present invention to provide an apparatus and method for locating mobile terminals which allows location determination of mobile terminals, whose identifiers are not known among mobile terminals located in a specific area.

It is another object of the present invention to provide an apparatus and method for locating mobile terminals, which allows location determination of all mobile terminals located in a specific area irrespective of detection of their identifiers.

It is a further object of the present invention to provide an apparatus and method for locating mobile terminals, which allows rapid location determination of all mobile terminals irrespective of the number of the mobile terminals.

It is another object of the present invention to provide an apparatus and method for locating mobile terminals, which allows location determination of mobile terminals irrespective of whether the provision of their location information is permitted.

It is yet another object of the present invention to provide an apparatus and method for locating mobile terminals, which facilitates disaster or calamity rescue by locating all mobile terminals located in a specific area where a disaster or calamity occurs.

In accordance with one aspect of the present invention, the above and other objects can be accomplished by the provision of a method for locating mobile terminals, according to the steps of receiving a location request message, requesting location of mobile terminals located in a specific area, from an external client; calculating an identifier of a base station covering the specific area and a list of cells included in the specific area, in response to the location request message; calculating auxiliary location information for calculating locations of the mobile terminals, based on the calculation result transmitting the calculated auxiliary location information to all of the mobile terminals located in the specific area; and receiving location calculation results of all mobile terminals that have received the auxiliary location information.

In accordance with another aspect of the present invention, there is provided an apparatus for locating mobile terminals, including a base station for transmitting a radio signal to mobile terminals located in a specific area, and generating auxiliary location information for location measurement of the mobile terminals from a radio signal received from the mobile terminals; a radio network controller for receiving auxiliary location information of mobile terminals from the base station, and calculating locations of the mobile terminals using the auxiliary location information; a cell broadcaster for broadcasting information including assisted GPS information and an auxiliary location information request signal to the mobile terminals located in the specific area; and a network portion for managing information of mobile terminals connected to a network, and providing an interface with a location service client.

BRIEF DESCRIPTION OF THE DRAWINGS

The above and other objects, features and other advantages of the present invention will be more clearly understood from the following detailed description taken in conjunction with the accompanying drawings, in which:

FIG. 4 is a signal flow diagram showing a method for locating mobile terminals according to an embodiment of the present invention; and.

DETAILED DESCRIPTION OF THE PREFERRED EMBODIMENTS

Now, preferred embodiments of the present invention will be described in detail with reference to the annexed drawings. In the following description, a detailed description of known functions and configurations incorporated herein will be omitted when it may make the subject matter of the present invention rather unclear.

Figure 3:
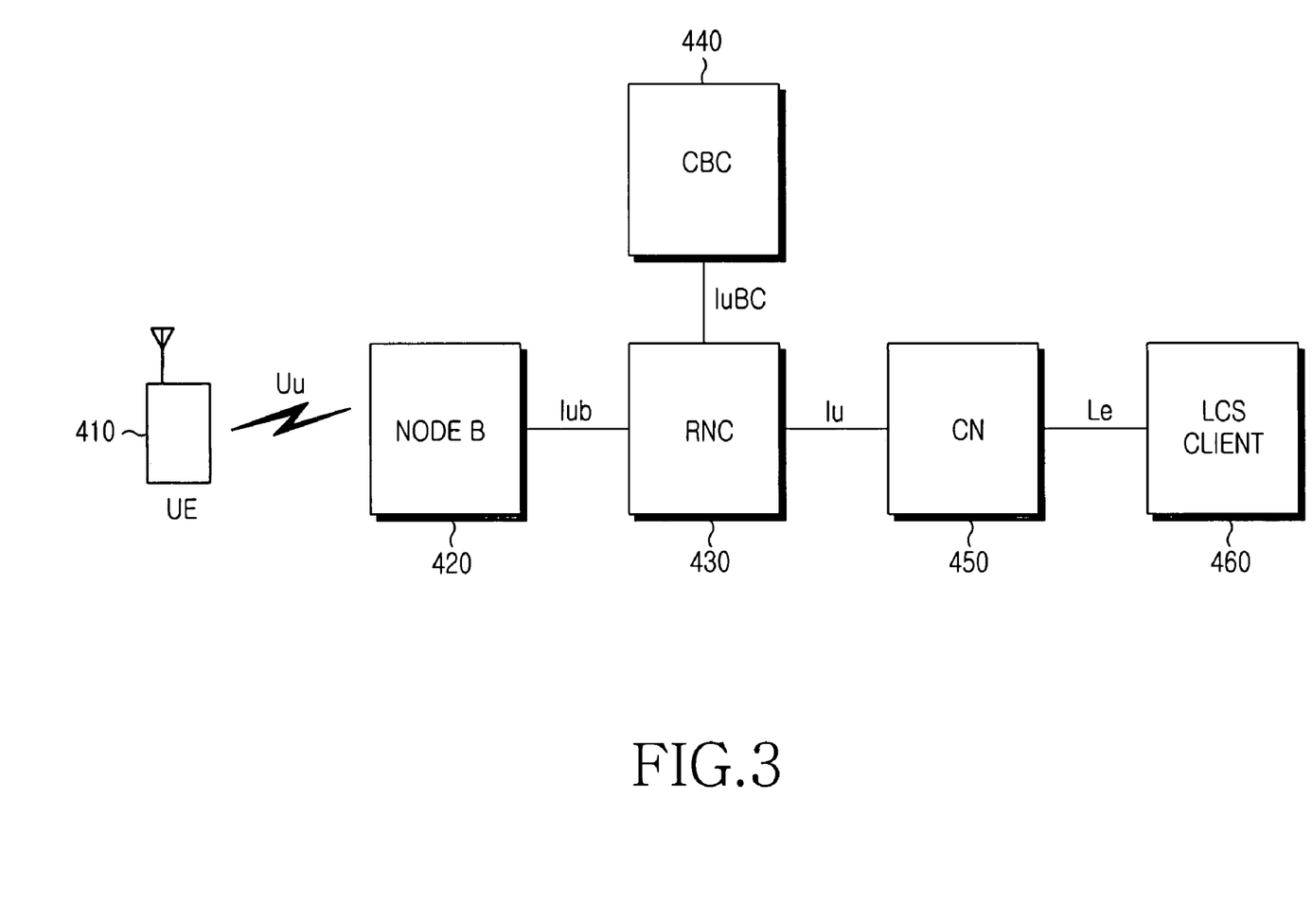
FIG. 3 is a block diagram showing the configuration of a system for locating mobile terminals according to an embodiment of the present invention.

FIG. 3 is a block diagram showing the configuration of a system for locating mobile terminals according to an embodiment of the present invention. As shown in FIG. 3, the mobile terminal location system according to the embodiment of the present invention includes a base station (node B) 420, a Radio Network Controller (RNC) 430, a Cell Broadcast Center (CBC) 440 and a Core Network (CN) 450.

The base station (node B) 420 transmits radio signals to mobile terminals or User Equipments (UEs) located in a specific cell. The base station 420 obtains location measurement signals (for example, Time Of Arrival (TOA) or Time Difference Of Arrival (TDOA)) from radio signals received from the UEs, and then transfers the location measurement signals to the RNC 430.

The RNC 430 receives the location measurement signals of the UEs from the base station (node B) 420 and calculates locations of the UEs based on the location measurement signals.

The CBC 440 is an element for broadcasting a transfer message to a specific cell. In the present invention, the CBC 440 serves to request an idle UE to provide its location information and also serves to transfer a list of base stations and locations thereof.

The CN 450 manages information of UEs, and performs mobility management, session management and call management. The CN 450 also provides an interface with an external Location Service (LCS) client 460. That is, the CN 450 receives a location request, requesting location determination of UEs (for example, a UE 410) located in a specific area, from the LCS client 460, and transmits a response to the request to the LCS client 460.

The operation of the elements described above will now be described in more detail.

If the LCS client 460 uses an Le interface to transmit a location request message requesting location determination of UEs located in a specific area, the CN 450 receives the message and transfers it to the RNC 430 via an Iu interface. Using an IuBC interface, the RNC 430 transfers data (for example, information of the type of cell broadcast data and auxiliary location information), which is required to perform cell broadcast for obtaining location information as a response to the location request message, to the CBC 440. Then, using the data received from the RNC 430, the CBC 440 broadcasts the auxiliary location information (for example, a list of base stations and locations of serving and neighboring base stations). This is to allow the RNC 430 to identify idle UEs located in a specific cell, receive responses from the UEs and determine locations of the UEs.

Figure 5:
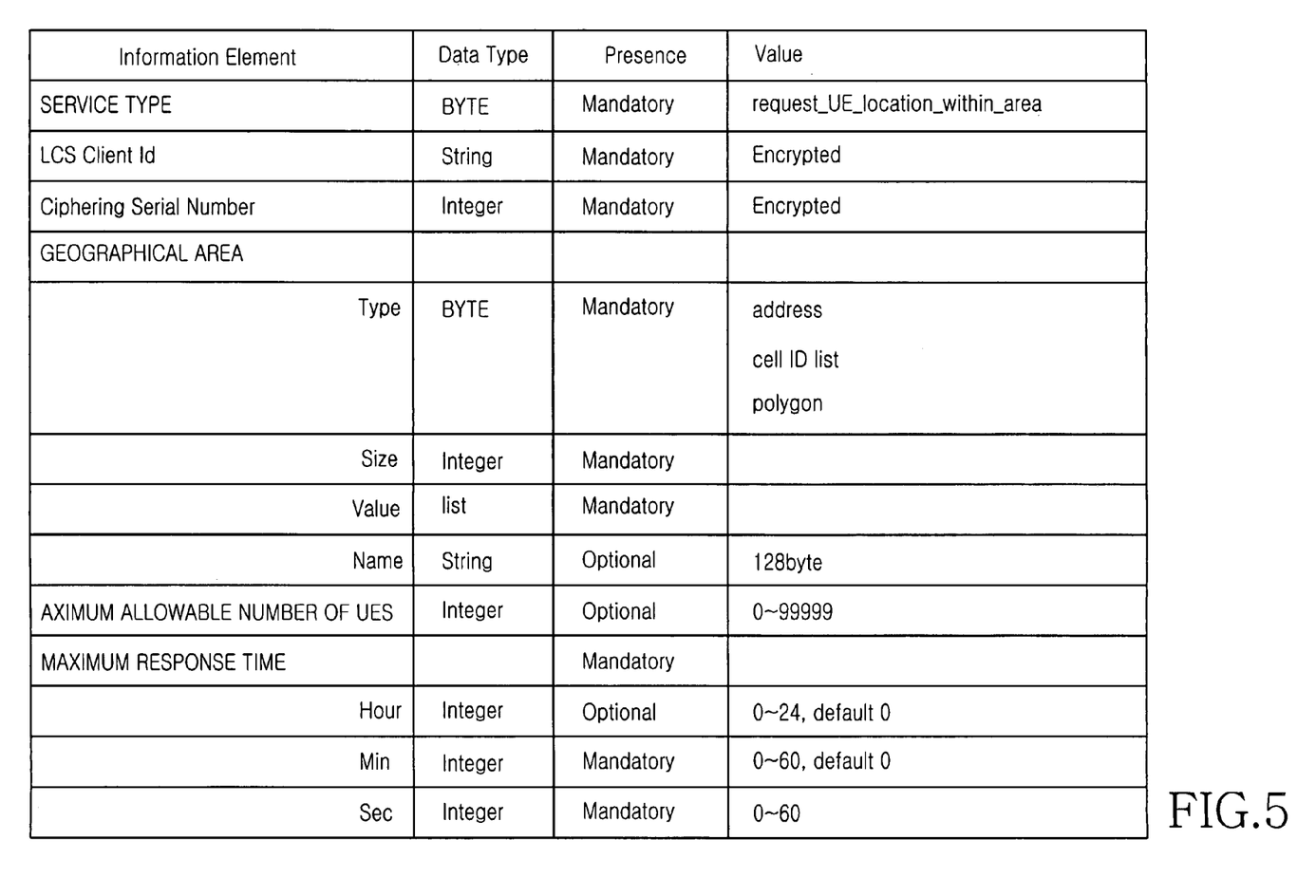
FIGS. 5 and 6 are tables illustrating the configuration of messages transmitted/received for locating mobile terminals in a mobile communication system according to the present invention.

FIG. 5 shows the configuration of an example of the location request message transmitted from the LCS client 460 to the CN 450. As shown in this figure, the location request message is composed of fields such as a service type, an LCS client ID, a ciphering serial number (or a ciphering code), geographical area information, the maximum allowable number of UEs, and a maximum response time. Here, the geographical area information is preferably expressed by at least one of an address, a cell list and a polygon. For example, the geographical area information is composed of a set of {an RNC identifier, a cell list}.

Upon receipt of such a location request message, the CN 450 calculates an RNC and a cell list matched to the geographical area information included in the location request message, and then transfers the location request message to the RNC matched to the geographical area information. For example, the CN 450 transfers a location request message, including a service type, {an RNC identifier, a cell list}, the maximum allowable number of UEs and a maximum response time, to the RNC 430. The CN 450 also makes up a single list by collecting all of the list of UEs and the locations thereof received as a response from the RNC 430.

From cell information of a specific area received from the CN 450, the RNC 430 retrieves a list of connected the UEs located in the specific area, and also transfers auxiliary location information, required to confirm (or recognize) the UEs that are located in the corresponding area but in the idle state, to the CBC 440. The RNC 430 makes a location request to connected UEs via a Dedicated Control Channel (DCCH), whereas it makes a location request and broadcasts auxiliary location information to idle UEs through the CBC 440. Here, the CBC 440 preferably broadcasts the auxiliary location information in the form of a SMS message.

The RNC 430 calculates locations of the UEs based on location measurement information (for example, a Time of Arrival (TOA) or a Time Difference of Arrival (TDOA)) obtained from responses from the UEs. To this end, the RNC 430 preferably has stored an algorithm that calculates respective locations of the UEs based on the location measurement information obtained from responses from the UEs. The RNC 430 also performs a verification process to determine whether all possible UEs located in a specific area have responded.

The base station (node B) 420 performs data communication with UEs. The base station (node B) 420 transmits predetermined radio signals to the UEs, and measures radio signals received from the UEs to transfer auxiliary location measurement information such as a TOA and a TDOA to the RNC 430.

The UE 410 transmits a radio signal for location measurement to the base station (node B) 420 or transfers TOA and TDOA measurements and the accuracy of the measurements to the base station (node B) 420. For example, if an idle UE receives a CBS broadcast message making a location request, the idle UE first responds to the message. If the UE has a Location Service (LCS) function or a GPS function, the function can be used to allow the RNC 430 to perform improved location calculation, so that additional message exchange is performed.

Figure 4:
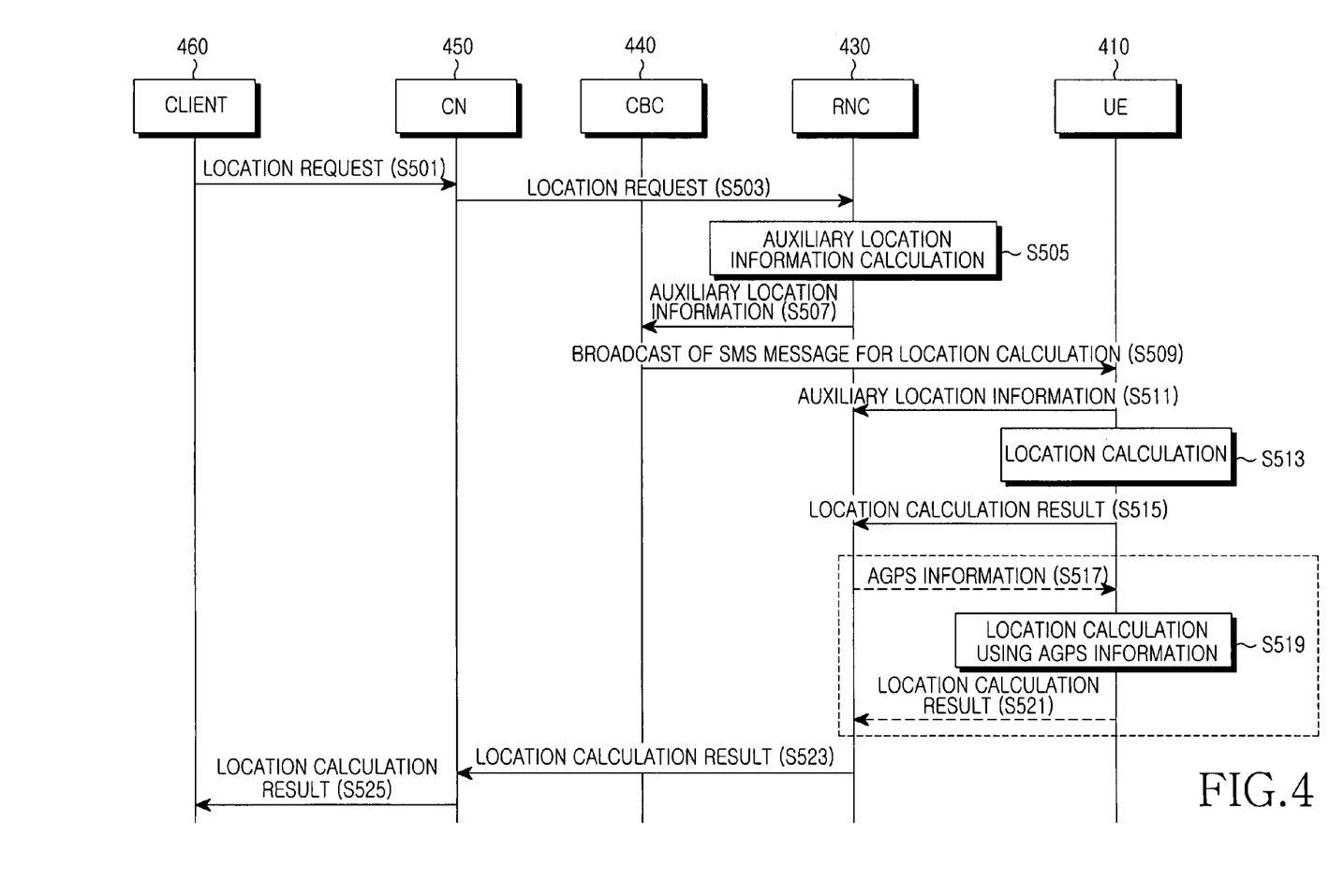

FIG. 4 is a process flow diagram showing a method for locating mobile terminals according to an embodiment of the present invention. That is, FIG. 4 illustrates a method for locating mobile terminals for the mobile terminal location system shown in FIG. 3.

In the mobile terminal location method according to the embodiment of the present invention, as shown in FIG. 4, first, an external client 460 in step S501 requests a CN 450 to locate UEs located in a specific area. To make this request, the client 460 uses a location request message including information elements illustrated in FIG. 5. As shown in FIG. 5, the location request message is composed of fields such as a service type, an LCS client ID, a ciphering serial number, geographical area information, the maximum allowable number of UEs and a maximum response time. The geographical area information can be expressed by at least one of an address, a cell list and a polygon.

Upon receipt of the location request message, the CN 450 calculates an RNC identifier and a cell list corresponding to a specific area, based on the geographical area information such as a polygon included in the location request message. To accomplish this, the CN 450 preferably includes therein an LCS (Location Service) server, for example, a $3^{rd}$ Generation Partnership Project (3GPP) GMLC (Gateway Mobile Location Center), for providing location calculation services. The LCS server performs authentication of the LCS client 460 using the ciphering serial number and geographical code conversion. Then, in step S503 the CN 450 transfers a location information request message based on the converted geographical information to an RNC 430. Here, the geographical area information includes a set of {an RNC identifier, a cell list}, and the location request message transferred to the RNC includes a service type, {an RNC identifier, a cell list}, the maximum allowable number of UEs and a maximum response time.

Upon receipt of the location request message, the RNC 430 needs to first confirm UEs located in the corresponding cell from the cell list. Generally, information of a list of UEs connected to a communication network from among UEs located in a corresponding cell, related cells or a URA (UTRAN Registration Area) can be retrieved from a storage unit of the RNC 430. Thus, the UEs connected to the communication network are confirmed using the information retrieved from the storage unit of the RNC 430. However, since the RNC 430 has no information relating to idle UEs, confirmation of the idle UEs requires a separate process.

On the contrary, in the present invention, to allow confirmation of idle UEs and signal communication for location measurements of the idle UEs to be performed together, in step S505 the RNC 430 calculates a plurality of auxiliary location information required for TDOA-based location determination in advance before broadcasting, as described below, and transfers the calculated information to a CBC 440 in step SS507. Then, based on the calculated auxiliary location information, in step S509 the CBC 440 broadcasts an SMS message for location calculation via the RNC 430, while transferring the auxiliary location information to the UEs 410 in step SS511. Here, the auxiliary location information broadcasted by the SMS message in step S509 is transferred to idle UEs, whereas the auxiliary location information transferred in step S511 is transferred to UEs connected to the communication network.

Figure 6:
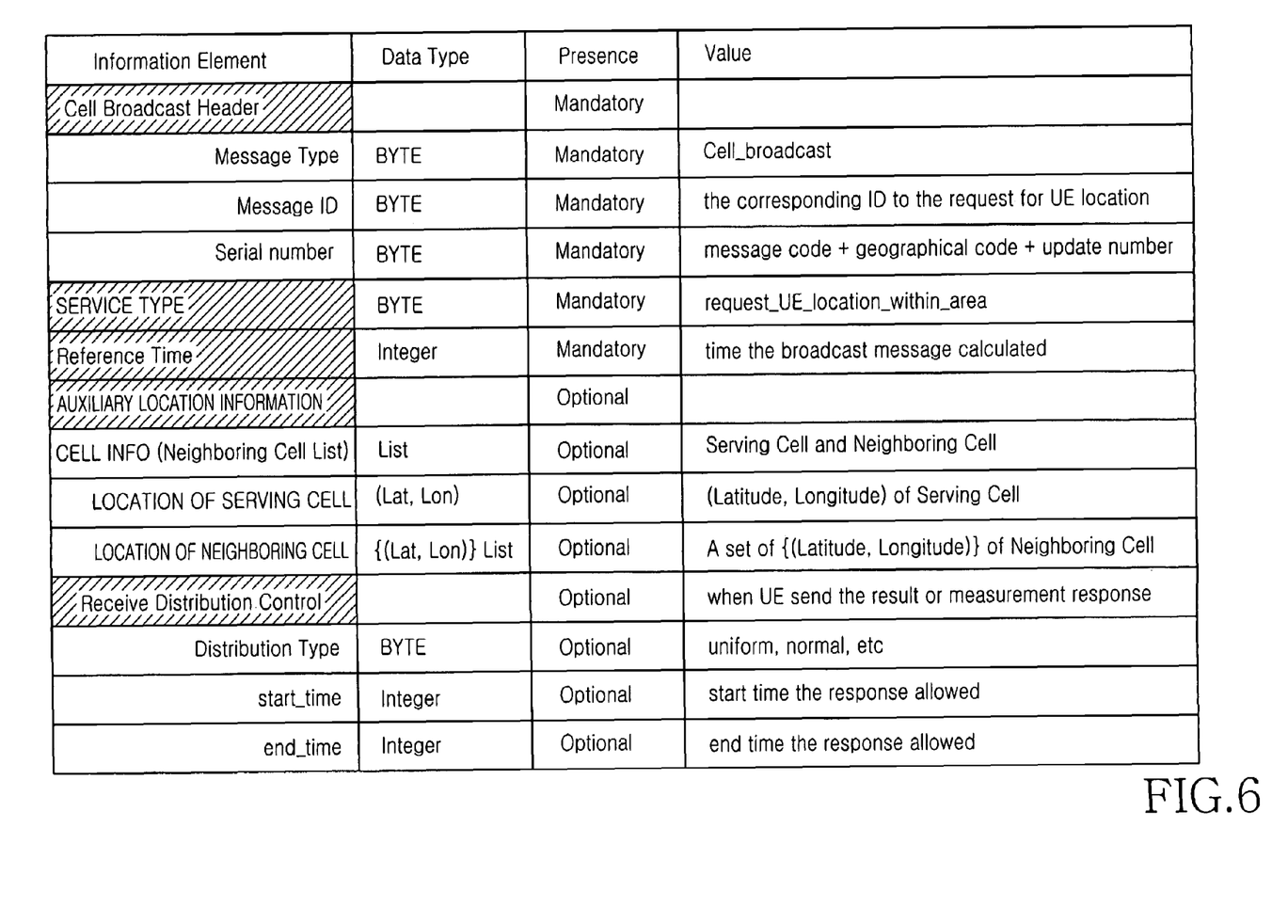

FIG. 6 shows information elements of a broadcast message transferred from the CBC 440 to the UE 410. As shown in FIG. 6, the broadcast message is mainly divided into CBC header information, location request header information, auxiliary location information and response distribution control. The CBC header information includes a message type, a message ID and a serial number. The location request header information includes a location request service type, auxiliary location information, and time information when a corresponding CBS message is produced.

The auxiliary location information is produced at the above described step 505 in any one of a UE-based location method in which a UE directly calculates the location and a UE-assisted location method in which the location is calculated based on a UE signal received from a network. It is preferable that, to avoid data congestion due to responses from a large number of UEs in a specific area, which receive auxiliary location information transmitted in steps S509 and S511, the CBC 440 and the RNC 430 additionally transmit an allowed response time interval and a requested-response distribution function when transmitting the auxiliary location information. The steps S509 and S511 may be performed in a different order.

Then, in step S513 the UE 410 calculates location based on the auxiliary location information, and transmits the calculation result to the RNC 430 in step S515. The RNC 430, in turn, transmits the location calculation result to the CN 450 and the client 460 in steps S523 and S525. The CN 450 produces a single list by collecting a list of UEs and respective locations of the UEs received as a response from the RNC 430. If the UE 410 is in the idle state, the UE 410 receives the SMS message, and uses Information Elements (IEs) in the SMS message to transfer both a response for allowing the provision of its location information, and information that the UE 410 is present in the corresponding cell.

Here, in step S515 the UE 410 reports location measurements or location results sequentially to the RNC using a given response distribution variable, irrespective of whether the UE 410 is connected to the communication network or is in the idle state. For example, after the UEs connected to the communication network and the idle UEs all shift to a "Cell_DCH state", they report OTDOA measurements or corresponding information to the RNC.

If there is a large number of UEs in a specific area, the RNC may receive a large amount of information, and therefore the information must be divided in time. Accordingly, the CBC 440 and the RNC 430 preferably add a control signal for time division to the auxiliary location information transmitted to the UEs 410 at the above steps S509 and S511. In this manner, the RNC 430 sequentially obtains locations of UEs located in a specific area and the accuracy of the locations, based on location measurements received from the UEs 410.

In order to assume that all UEs in the specific area have responded to the service described above, the RNC 430 must perform a corresponding verification process, but the RNC 430 cannot confirm (or recognize) a response message received from the UE 410 if it is in the idle state. Thus, it is preferable that the CBC 440 repeatedly transmits the SMS message. Alternatively, it is preferable that the CN 450 use preliminary connection information and preliminary location information to transfer an idle UE list to the RNC 430, and the RNC 430 use the idle UE list to determine which idle UEs have responded to the SMS message. If there is an idle UE that is determined not to have responded to the SMS message, it is preferable to make a location request to the idle UE by transmitting an additional SMS message to the idle UE.

If the UE 410 can calculate location using a GPS function or a different location method to achieve more accurate location, optionally and preferably, in step S517 the RNC 430 transfers assisted GPS information, such as GPS satellite orbit information, time information and DGPS correction information, to the UE 410 and the UE 410 performs more accurate location calculation based on the assisted GPS information in step S519 and then transfers the calculation result to the RNC 430 in step S521.

Then, in step S523 the RNC 430 uses the transmission result in step S521 to transfer a list of UEs located in a specific area, the locations of the UEs and the accuracy of the locations to the CN 450, and the CN 450 makes up a single list by collecting all of the list of the UEs and the locations thereof received from the RNC 430 and then transfers the single list to the client 460 in step S525.

As apparent from the above description, the present invention provides an apparatus and method for locating mobile terminals that makes it possible to locate all mobile terminals located in a specific area, irrespective of detection of their identifiers, and also to locate all of the mobile terminals rapidly irrespective of the number of the mobile terminals, and further to locate mobile terminals irrespective of whether the provision of their location information is permitted. Thus, it is possible to locate all mobile terminals located in a specific area where a disaster or calamity occurs, thereby facilitating a rescue operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention should not be limited to the above embodiments, but defined by the accompanying claims as well as equivalents thereof.

What is claimed is:

1. A method for locating mobile terminals having identifiers that are not known, said locating being performed irrespective if whether provision of the mobile terminals' location information is permitted, said method comprising the steps of:
   a) receiving a location request message, requesting location of mobile terminals located in a specific area, from an external location service client;
   b) determining an identifier of a base station covering the specific area and a list of cells of the specific area, in response to the location request message;
   c) confirming, by using a result of the determination, whether the mobile terminals located in a cell of the specific area are respectively connected to a network or are in an idle state, and calculating auxiliary location information for calculating locations of the mobile terminals, based on the determination result in step b);
   d) transmitting the auxiliary location information to the connected mobile terminals through a dedicated channel and broadcasting a message including the auxiliary location information to an idle mobile terminal; and
   e) receiving location calculation results of all mobile terminals that have received the auxiliary location information.

2. The method according to claim 1, wherein step a) includes the step of receiving a location request message including a service type, a client ID, a ciphering code, geographical area information, the maximum allowable number of UEs, and a maximum response time.

3. The method according to claim 2, wherein the geographical area information is expressed by at least one of an address and a cell list.

4. The method according to claim 1, wherein in step (c), the auxiliary location information is calculated according to a one of a calculation method in which a mobile terminal directly calculates auxiliary location information and a calculation method in which information for calculating auxiliary location information is received from a mobile terminal and the auxiliary location information is calculated based on the received information.

5. The method according to claim 1, further comprising the step of generating a list of idle mobile terminals among the mobile terminals located in the specific area, using preliminary connection information, wherein step d) is repeated until responses of all of the idle mobile terminals included in said list of the idle mobile terminals are received.

6. The method according to claim 1, wherein step (d) includes the step of broadcasting the calculated auxiliary location information in the form of an SMS message to idle mobile terminals among the mobile terminals located in the specific area.

7. The method according to claim 1, wherein step (d) includes the step of transmitting an allowed response time interval and a requested-response distribution function, together with the auxiliary location information, to avoid data congestion due to responses from a plurality of unspecified mobile terminals located in the specific area.

8. The method according to claim 1, wherein step (d) includes the step of repeatedly transmitting the auxiliary location information a predetermined number of times to increase reception reliability of a mobile terminal.

9. The method according to claim 1, wherein step (d) includes the step of transmitting the auxiliary location information after adding a control signal for time division to the auxiliary location information.

10. The method according to claim 1, further comprising the step of transmitting assisted GPS information, including GPS satellite orbit information, time information and correction information, to the mobile terminals, and receiving a location calculation result obtained based on the assisted GPS information from the mobile terminals.

11. An apparatus for locating mobile terminals having identifiers that are not known, said locating being performed irrespective of whether provision of the mobile terminals' location information is permitted, said apparatus comprising:

a core network for managing information of mobile terminals connected to a network and receiving a location request message, requesting location of mobile terminals located in a specific area from a location service client;

a radio network controller for, if the location request message is received, determining, by using an identifier of a base station covering the specific area and a list of cells of the specific area, whether the mobile terminals located in a cell of the specific area are respectively connected to a network or are in an idle state, and calculating auxiliary location information for calculating locations of the mobile terminals;

a cell broadcaster for broadcasting a message including the auxiliary location information in the specific area to transmit the auxiliary location information to an idle mobile terminal; and a base station for transmitting the auxiliary location information to the connected mobile terminals through a dedicated channel and receiving a result of calculating a location of the mobile terminals that receive the auxiliary location information.

12. The apparatus according to claim 11, wherein the base station receives a location measurement signal, including at least one of a Time of Arrival (TOA) or a Time Difference of Arrival (TDOA), from a mobile terminal, thereby performing a location calculation of the mobile terminals.

13. The apparatus according to claim 11, wherein the core network transfers data to the cell broadcaster, said data being required to perform cell broadcast for obtaining location information of the mobile terminals when receiving the location request message, requesting location of the mobile terminals located in the specific area.

14. The apparatus according to claim 13, wherein the location request message includes a service type, a client ID, a ciphering code, geographical area information, the maximum allowable number of mobile terminals and a maximum response time.

15. The apparatus according to claim 14, wherein the geographical area information is expressed by at least one of an address and a cell list.

16. The apparatus according to claim 14, wherein the network portion includes a processing module for providing a location calculation service, said module converting the geographical area information included in the location request message and performing authentication of a location service client.

17. The apparatus according to claim 11, wherein the cell broadcaster broadcasts the auxiliary location information in the form of an SMS message.

18. The apparatus according to claim 17, wherein the cell broadcaster includes information of a list of idle mobile terminals among the mobile terminals located in the specific area, said information of the list being generated based on preliminary connection information, and the cell broadcaster broadcasts the SMS message.

19. The apparatus according to claim 17, wherein the cell broadcaster transmits an allowed response time interval and a requested-response distribution function, together with the auxiliary location information, to avoid data congestion due to responses from a plurality of unspecified mobile terminals located in the specific area.

20. The apparatus according to claim 17, wherein said broadcaster repeatedly transmits the auxiliary location information a predetermined number of times to increase reception reliability of a mobile terminal.

21. The apparatus according to claim 17, wherein the cell broadcaster transmits the auxiliary location information after adding a control signal for time division to the auxiliary location information.

* * * * *